United States Patent [19]

Bernard et al.

[11] Patent Number: 4,499,222

[45] Date of Patent: Feb. 12, 1985

[54] PHOSPHORUS-CONTAINING FLAME PROOFING COMPOSITIONS FOR SYNTHETIC MATERIALS

[75] Inventors: Michel Bernard, Levallois; Daniel Baldé, Paris; Elie Ghenassia, Chocques; Francois Laumain, Levallois, all of France

[73] Assignee: Produits Chimiques Ugine Kuhlmann, France

[21] Appl. No.: 523,640

[22] Filed: Aug. 15, 1983

[30] Foreign Application Priority Data

Aug. 24, 1982 [FR] France ................. 82 14518

[51] Int. Cl.³ ............................... C08K 5/53
[52] U.S. Cl. ..................... 524/123; 106/177; 524/130; 525/538; 528/398
[58] Field of Search ............... 106/177; 260/931, 961; 521/108; 524/123, 130; 525/538; 528/398

[56] References Cited

U.S. PATENT DOCUMENTS

| 2,725,311 | 11/1955 | Kenaga et al. | 260/961 |
| 2,993,859 | 7/1961 | Watson | 260/961 |
| 3,250,827 | 5/1966 | Schroll | 260/961 |
| 3,325,563 | 6/1967 | Taylor et al. | 260/961 |
| 3,400,085 | 9/1968 | Kujawa et al. | 524/130 |
| 3,929,688 | 12/1975 | Honig | 524/130 |
| 3,991,010 | 11/1976 | Noetzel et al. | 260/961 |
| 4,025,468 | 5/1977 | Modena et al. | 260/931 |
| 4,066,730 | 1/1978 | Mimura et al. | 524/123 |
| 4,144,387 | 3/1979 | Anderson et al. | 521/108 |

Primary Examiner—Morton Foelak
Assistant Examiner—Kriellion Morgan
Attorney, Agent, or Firm—Brooks, Haidt, Haffner & Delahunty

[57] ABSTRACT

Phosphorus-containing flame proofing mixtures with low crystallization temperatures and with the ability significantly to improve the flame resistance of materials without adversely affecting the other properties of the materials, the mixtures being principally comprised of phosphonates having the structure:

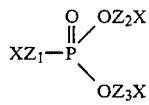

wherein X is chloro or bromo; $Z_1$, $Z_2$ and $Z_3$ are the same or different and are $-CH_2-CH_2-$ or

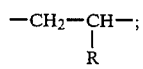

and R is $CH_3$ or $CH_2Cl$, and the molar ratio of the $-CH_2-CH_2-X$ groups to the total of $-CH_2-CH_2-X$ and the $-CH_2-CHR-X$ groups is from 2 to 90%, these flame proofing mixtures being usable with both synthetic and natural materials, together with the flame-resistive natural and synthetic materials so made.

8 Claims, No Drawings

PHOSPHORUS-CONTAINING FLAME PROOFING COMPOSITIONS FOR SYNTHETIC MATERIALS

BACKGROUND OF THE INVENTION

The present invention relates to flame proofing compositions, and more particularly, it relates to phosphorus-containing flame proofing compositions for synthetic materials and to synthetic materials containing such flame proofing agents.

Some phosphorous flame proofing mixtures effective for flame proofing polymeric materials, and especially for flame proofing flexible or rigid polyurethane foams, have been described in U.S. Pat. No. 4,144,387. The mixtures described in this patent contain the 2-chloroethyl phosphonate of bis-(2-chloroethyl):

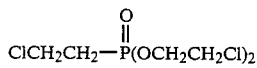

and high-boiling polyphosphonates, including among others a dimer composition of the proposed structure:

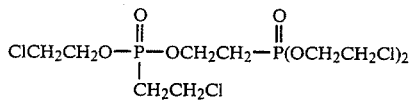

Good results are obtained with these mixtures in accelerated thermal aging tests.

Nevertheless, the mixtures described in this patent have the drawback of crystallizing easily at ambient temperatures. Thus, a commercial product according to the aforesaid patent, made by Mobil Oil Corporation under the name "Antiblaze 78", contains about 65% by weight of the chloroethyl phosphonate of bis-(chloroethyl) and about 35% of high-boiling polyphosphonates obtained directly by thermal isomerization of tris-(2-chloroethyl) phosphite, as shown in the patent, and it contains about 12% by weight of phosphorus, this material having a crystallization temperature of about 23° C. Some mixtures according to the foregoing patent, prepared in the laboratory or on a pilot scale, by direct isomerization of the tris-(2-chloroethyl) phosphite under various operating conditions of temperature and reaction volume, and containing quantities comprised between 60 and 85% of the chloroethyl phosphonate of bis-(chloroethyl) similarly show crystallization temperatures of from about 20° to 30° C. This ready crystallization at ambient temperatures constitutes a major drawback in the commercial use of such mixtures, due to the risk of solidification during their storage or use, with attendant fouling of pumps and piping.

THE INVENTION

The present invention provides new flame proofing mixtures containing phosphorus, providing improved performance in fire conditions, which is also durable and has a lower crystallization temperature. The invention equally provides synthetic material compositions with better performance in fire conditions, and particularly provides polyurethane-based materials, the compositions comprising novel flame proofing mixtures.

Briefly, it has been discovered according to the present invention, against all expectation, that certain mixtures principally containing a number of phosphonates having the structure:

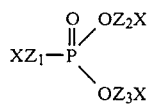

wherein X is chloro or bromo; $Z_1$, $Z_2$ and $Z_3$ are —CH$_2$—CH$_2$— or $$-CH_2-CH-$$
$$\phantom{-CH_2-}\mid$$
$$\phantom{-CH_2-}R$$

and R is $CH_3$ or $CH_2Cl$ and where the overall molar percentage of the —ZX groups of the haloethyl type (—CH$_2$—CH$_2$—X) comprise from about 2 to about 90%, do not crystallize at ambient temperatures and have lower crystallization temperatures, for instance, 13° C. or less.

The mixtures according to the present invention provide a greater flame proofing efficiency, superior at the same time to that of the prior art products, as shown after accelerated aging tests. These results are unexpected because the mixtures of this invention are comprised of higher molecular weight elements than the prior art mixtures, replacing the haloethyl groups by halopropyl groups, and show nevertheless distinctly lower crystallization temperatures.

Likewise, despite the overall reduced phosphorus content of these mixtures of the invention with respect to those of the prior art, the flame proofing efficiency observed is at least equal to and even greater than the prior art after accelerated aging tests.

The phosphonate mixtures of the present invention can for example be easily and directly obtained by isomerization of phosphite mixtures having the structure:

wherein X, $Z_1$, $Z_2$, and $Z_3$ are as defined above.

This process for preparing the materials can be a thermal isomerization (an Arbuzov rearrangement), in which case the reaction is generally carried out at temperatures on the order of 150° to 200° C. The process can be carried out by charging the mixture of phosphites to a reactor and progressively heating the system up to the reaction temperature (the so-called "bulk" process). This process is applicable on a laboratory scale; however, the Arbuzov rearrangement is accompanied by a considerable exotherm which requires close control of the reaction temperature to avoid a runaway reaction.

For this reason, it is preferable to utilize the so-called "charged vat" process in which the mixture of phosphites is introduced gradually into a reactor which already contains a certain volume of phosphonate mixture and kept at the reaction temperature. The preparation of the phosphonate mixture is terminated by stripping, or topping, under reduced pressure to drive off the volatile products (halogenated alkanes) generally formed.

Examination of the phosphonate mixtures of the present invention by nuclear magnetic resonance (NMR) techniques, both by proton and carbon-13, permits determination of the overall molar percentage of the $-ZX$ groups of the haloethyl ($-CH_2-CH_2-X$) with respect to the total haloethyl and halopropyl groups present. The mixtures of phosphites utilized in the Arbuzov rearrangement are easily obtained by the usual chemical reactions. It is possible, for example, to condense a phosphorous trihalide $PX_3$, with two or more alkylene oxides such as ethylene oxide, propylene oxide or epichlorohydrin, in appropriate quantities.

The phosphonate mixtures of this invention can equally well be obtained by thermal isomerization of a mixture of two or more phosphites such as:

$$P(OZ_1X)_3 + P(OZ_2X)_3 + P(OZ_3X)_3$$

in which $Z_1$, $Z_2$ and $Z_3$ are strictly different, that is, by way of example, a mixture in all proportions of tris-(chloroethyl) phosphite, tris-(chloropropyl) phosphite, and/or tris-(dichloropropyl) phosphite.

At the time of thermal isomerization of the halogenated phosphites by the Arbuzov rearrangement, secondary reactions of the intermolecular type (Michaelis-Arbuzov reactions) simultaneously occur and lead to the formation of halogenated alkanes (eliminated by stripping under vacuum) and of phosphonate oligomers having the probable general structure:

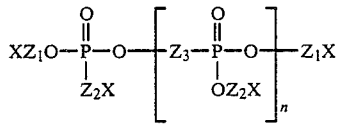

and/or

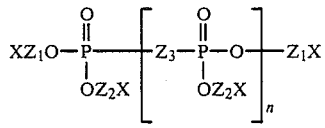

where X, $Z_1$, $Z_2$ and $Z_3$ are as above, and n is an integer of one or more.

The entirety of these phosphonate oligomers (di-, tri-, tetra-, and so on) possibly present as secondary constituents of the mixtures of the invention, that is, in an amount less than about 45% by weight, is designated by the general term "polyphosphonates".

The invention thus furnishes flame proofing mixtures containing phosphorus with a low crystallization point characterized in that they are principally comprised of several phosphonates of the structure:

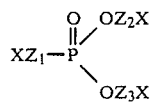

wherein X is chloro or bromo; $Z_1$, $Z_2$ and $Z_3$ are $-CH_2-CH_2-$ or

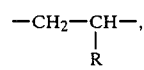

and R is $CH_3$ or $CH_2Cl$, and are such that the molecular ratio of the $-CH_2-CH_2-X$ groups to the total quantity of $-CH_2-CH_2-X$ and $CH_2-CHR-X$ groups is from 2 to 90%.

The invention equally provides flame proofing mixtures characterized in that they also contain up to about 45 weight percent of high boiling point polyphosphonates which principally correspond to the structure:

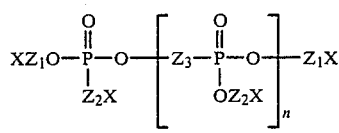

and/or

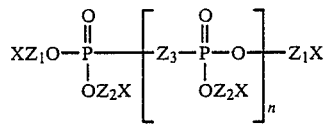

wherein X, $Z_1$, $Z_2$ and $Z_3$ have the meanings set forth above, and n is an integer of one or more.

Analysis of the mixtures of the invention by steric exclusion chromatography permits determining the overall weight percent of the polyphosphonates formed.

The flame proofing mixtures according to the present invention are utilized to improve the fire resistive performance of plastics and other synthetic materials. The products of the present invention are particularly suited for polyurethane-based materials, including flexible foams, rigid foams, elastomers, and the like. The flame proofing mixtures of the present invention can equally be utilized efficiently to improve the fire resistive performance of other synthetic materials. By way of illustration, the materials of the present invention are desirably used for unsaturated polyester resins, epoxy resins, PVC resins, paints and varnishes, synthetic textiles, natural textiles, cellulosic materials, and rubber-based compositions.

The flame proofing materials of this invention can be incorporated into combustible materials by any appropriate technique. In connection with polyurethane-based materials, the products of the invention can readily be mixed into the liquid components of the polyurethane system, that is, with the polyol, prepolymer, isocyanate, and catalyst, as required, before the polyurethane-forming reaction. They can equally be used with various foaming or mixing machines to be added directly to the reaction zone at the mixing head through use of a separate feed line.

Incorporation of the materials of the present invention into solid products can be carried out by the known mixing techniques. Again, in certain cases, it can be advantageous to prepare a preliminary emulsion of the mixtures of the present invention, as for example in an aqueous medium. Relatively small quantities of the mixtures of the present invention permit achievement of improved performance of the materials in fire conditions. Generally, the effective quantity utilized in practicing the invention is at least about 1% by weight of the material to be made fire resistive. On the other hand, larger amounts up to 20% by weight are not generally necessary, but they can nevertheless be utilized in such quantities.

It is also within the scope of the present invention simultaneously to use, in flameproof materials according to the presently described novel mixtures, other additives designed to modify or improve the properties of the materials. These additives in certain desirable embodiments of the invention include mechanical and reinforcing agents, antioxidants, plasticizers, coloring agents, pigments, thermal stabilizers, light or ultraviolet stabilizers, blowing agents, anti-shrinking additives, fillers, catalysts, and other products or agents for improving the fire resistive properties of the materials or the synergy of such agents, including antimony trioxide.

The reaction to fire of flame proofed materials in the scope of this invention can be measured by a method acting to determine the "oxygen index". The oxygen index (O.I.) is defined as being the lowest value of oxygen concentration by volume contained in an oxygen-nitrogen mixture which permits combustion to be maintained on a test sample of the material. This test method is described in detail in French Standard NFT 51071 and in ASTM test method D-2863-76.

This laboratory test is used for a comparative evaluation under the usual test conditions of the reaction to flame of test pieces of materials. For cellular materials, the cross-section of the test piece is 12.5×12.5 mm. Under laboratory conditions, the greater the value of the observed O.I., the greater is the flame proofing efficiency of the additive.

Another usual test method is also utilized to evaluate the flame behavior of cellular materials. This is carried out according to the method described in ASTM Standard D-1692-68, "Flammability of plastic sheeting and cellular plastics".

This standard involves exposing the end of a horizontal test sample, having dimensions of 150×50×13 mm, supported by metallic fabric, to a flame from a gas burner for a period of 30 seconds. The test consists of measuring the length of material destroyed by burning, up to a maximum of 127 mm of the end exposed to the flame, and the duration of the propagation. The results are the mean calculated for five samples. If, for each sample examined, the length of destruction is less than 127 mm, the material is classified as "self-extinguishing" (SE) under the test conditions. In the other case, total destruction, the sample is classified as "burning" (B).

It should nevertheless be noted that these customary laboratory tests are not able to give actual information concerning the performance of the materials under fire, these tests not taking into account certain parameters which occur in actual fires.

Unless otherwise indicated herein, all parts, percentages, proportions, and ratios are by weight.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Into a 6-liter stainless steel autoclave, 1,234 g (8.99 moles) of distilled phosphorus trichloride, $PCl_3$, and 0.17 g of aluminum triisopropyl are introduced under nitrogen. Thereafter, 320 g (5.51 moles) of propylene oxide is gradually added with agitation and at ambient temperature.

After about 30 minutes, at the end of the exothermic reaction, 1,105 g (25.1 moles) of ethylene oxide is introduced over a three-hour period, this being a slight excess over stoichiometric. The agitation is continued during three hours, and then the reactor is heated to 40° to 45° C. while maintained under reduced pressure (10 torr) for one hour.

After filtration through silica wool, 2,376 g of a colorless liquid, having a refractive index at 20° C. of 1.481, is recovered. Examination of the proton/carbon-13 NMR spectrum shows that the product is a mixture of phosphites containing chloroethyl and chloropropyl groups.

A 250 ml glass reactor is used for the thermal isomerization at 180° C. of 303 g of the phosphite mixture obtained above. The phosphite mixture is introduced to the reactor in two steps: the initial 125 g is progressively heated to 180° C. with rigorous temperature control, and then after a one hour 30 minute period, 178 g is introduced during an hour and 20 minutes. The reaction environment is maintained at 180° C. for an additional two hours and 30 minutes. A sample of the reaction mixture then shows a residual phosphite quantity of 0.17% by weight, determined according to the conventional method using iodine in the presence of methanol.

After stripping under reduced pressure of 3 torr at 100°–120° C. for 45 minutes, 276 g of a colorless liquid is recovered. This product in the amount of 66 g is utilized as the vat charge for a second thermal isomerization reaction. There is added gradually at a temperature from 195° to 200° C. 210 g of the phosphite mixture previously obtained. The addition is made over a period of one hour and 15 minutes. This temperature is maintained for two hours, at the end of which time a residual phosphite determination shows a content lower than 0.02% in the medium.

After stripping under reduced pressure at 3 torr at a temperature of 100°–120° C. for 45 minutes, followed by filtration through a Gauthier filter, 253 g of a very slightly colored liquid is obtained. The stripping operation permits separation of 14 g of a mixture of volatile products comprising 1,2-dichloroethane and 1,2-dichloropropane.

Analytical examination by proton/carbon-13 NMR of the product obtained shows a mixture of phosphonates containing about 76 mole percent of chloroethyl groups and about 24 mole percent of chloropropyl groups. The mixture contains 11.4% by weight of phosphorus and 35.4% by weight of chlorine.

The product does not show any crystallization when the temperature is lowered to −30° C. Its flow point, measured according to NFT Standard 60105 is −39° C.

Examination by steric exclusion chromatography indicates that the mixture obtained contains about 27% by weight of high molecular weight polyphosphonates.

EXAMPLE II

Utilizing the successive addition conditions of Example I, the process is carried out with 1,543 g (11.24 moles) of distilled phosphorus trichloride containing 0.19 g of aluminum triisopropyl, 980 g (16.87 moles) of propylene oxide, and then 820 g (18.61 moles) of ethylene oxide. The recovery is 3,205 g of a phosphite mixture containing chloroethyl and chloropropyl groups.

A fraction of the mixture thus obtained, 283 g, is isomerized in bulk at 180°–185° C. as in Example I, and then another fraction is isomerized by the "charged vat" method at 180°–185° C. by introducing 214 g of the phosphite mixture into 75 g of the product isomerized in bulk.

When the reaction is stopped, the determination of phosphites shows less than 0.02% in the medium. After stripping under vacuum, 267 g of a colorless liquid is recovered. After proton/carbon-13 NMR analysis, it is found that the phosphonate mixture contains about 49 mole percent of chloroethyl groups and about 51 mole percent of chloropropyl groups. This mixture contains 10.5% by weight of phosphorus and 34.5% by weight of chlorine.

The product does not crystallize when the temperature thereof is lowered to −30° C. Its flow point is −33° C.

Examination by steric exclusion chromatography indicates that the mixture obtained contains about 24 weight percent of high molecular weight polyphosphonates.

EXAMPLE III

The process of Example I is repeated using successive addition of 1,467 g (10.68 moles) of distilled phosphorus trichloride containing 0.19 g of aluminum triisopropyl, 188 g (3.24 moles) of propylene oxide, and then 1,390 g (31.55 moles) of ethylene oxide. The 2,932 g of phosphite mixture recovered contains chloroethyl and chloropropyl groups.

A portion, 381 g, of the mixture so obtained is isomerized in bulk at 180°–185° C. as in Example I, and then another fraction is isomerized in the "charged vat" at 180°–185° C., with 232 g of the phosphite mixture being introduced into 75 g of the product isomerized in bulk.

When the reaction is stopped, a phosphite determination shows a content of 0.05% in the medium. After stripping, under vacuum, 288 g of a colorless liquid is obtained.

After proton/carbon-13 NMR analysis, it is found that the phosphonate mixture so obtained contains about 90 mole percent of chloroethyl groups and about 10 mole percent of chloropropyl groups. This mixture contains 11.8% by weight of phosphorus and 37.2% by weight of chlorine. The product shows a crystallization temperature of 12° C. and a flow point of 14° C.

Examination by steric exclusion chromatography indicates that the mixture obtained contains about 27 weight percent of high molecular weight polyphosphonates.

EXAMPLE IV

The process of Example I is repeated utilizing the successive addition of 1,533 g (11.16 moles) of distilled phosphorus trichloride containing 0.30 g of aluminum triisopropyl, 1,297 g (22.33 moles) of propylene oxide, and then 750 g (17.02 moles) of ethylene oxide. The 3,250 g of phosphite mixture recovered contains chloroethyl and chloropropyl groups.

A 73 g portion of the mixture so obtained is isomerized in bulk at 180°–185° C. as in Example I; and then another fraction is thereafter isomerized in the vat at 180°–185° C., with 180 g of the phosphite mixture being introduced into 70 g of the product obtained from bulk isomerization.

When the reaction is stopped, the phosphite determination shows a phosphite content below 0.02% in the reaction medium. After stripping under vacuum, 221 g of a colorless liquid is obtained.

After proton/carbon-13 NMR analysis, it is found that the phosphonate mixture so obtained contains about 33 mole percent of chloroethyl groups and about 67 mole percent of chloropropyl groups. This mixture contains 9.9 weight percent of phosphorus and 33.4 weight percent of chlorine. The product does not crystallize when the temperature is reduced to −30° C., and its flow point is −36° C.

Steric exclusion chromatography shows that the mixture so obtained contains about 24 weight percent of high molecular weight polyphosphonates.

EXAMPLE V

Example I is repeated using a successive addition of 1,163.5 g (8.47 moles) of distilled phosphorus trichloride containing 0.25 g of aluminum isopropyl, 470 g (5.08 moles) of epichlorohydrin, and then 995 g (22.59 moles) of ethylene oxide. The 2,505 g of recovered phosphite mixture contains chloroethyl and dichloropropyl groups.

A 71 g portion of the mixture so obtained is isomerized in bulk at about 180° C., as in Example I, and then another portion is isomerized in the vat at 180°–185° C., with 176 g of the phosphite mixture being introduced into about 70 g of the bulk isomerized product.

When the reaction is stopped, the phosphite determination shows a quantity of phosphite below 0.03% in the reaction medium. After stripping under vacuum, 226 g of a colorless liquid is recovered.

Proton/carbon-13 NMR analysis shows that the phosphonate mixture produced contains about 81 mole percent of chloroethyl groups and about 19 mole percent of dichloropropyl groups. The mixture contains 10.9 weight percent of phosphorus and 38.4 weight percent of chlorine. The product does not crystallize when the temperature is lowered to −30° C., and its flow point is −30° C.

Steric exclusion chromatography shows that the mixture contains about 28 weight percent of high molecular weight polyphosphonates.

EXAMPLE VI

A meticulously dried 80-liter stainless steel reactor is charged with 25.5 kg of phosphorus trichloride and 3.5 g of aluminum isopropyl. Following 15 minutes of agitation, 6.6 kg of propylene oxide is added during a one hour and 15 minute period, and then 22.8 kg of ethylene oxide is added during a four hour and 20 minute period, with the temperature being kept at 40° to 45° C. The mixture is further stirred for 30 minutes and, after holding under a reduced pressure of 15 to 20 torr for 30 minutes at 40° C., 54 kg of a phosphite mixture containing chloroethyl and chloropropyl groups is recovered from the reactor.

A 12-liter stainless steel reactor fitted with an agitator is charged with 2 kg of the chloroethyl/chloropropyl phosphonate mixture prepared under the conditions of Example I, and the reactor is heated to 165° C. with superheated steam. Thereafter, 10 kg of the phosphite mixture obtained in this Example is fed to the reactor during a period of 11 hours 30 minutes, while the reactor is maintained at a temperature of 165° C. and a pressure of 0.3 to 0.5 bar.

The reactor is then kept at 165° C. for a further two hours. At this stage, 888 g of 1,2-dichloroethane and 38 g of 1,2-dichloropropane have been produced.

A sample of the reaction medium then shows a residual phosphite content of 0.14 weight percent. The reaction mixture is heated under a pressure of 100 torr up to a temperature of 180° C. After cooling, determination of the phosphites shows a quantity thereof not greater than 0.05% in the reaction mixture.

Proton/carbon-13 NMR analysis shows that the mixture contains about 79 mole percent of chloroethyl groups and about 21 mole percent of chloropropyl groups. This mixture contains 12.5 weight percent of phosphorus and 33 weight percent of chlorine. The product does not show any crystallization when the temperature is lowered to −30° C., and the flow point is −39° C.

Steric exclusion chromatography shows that the mixture contains about 38.5 weight percent of high molecular weight polyphosphonates.

EXAMPLE VII

The formulation shown in Table I is used to produce slabs of flexible polyurethane foams.

TABLE I

| Ingredient | Parts by weight |
|---|---|
| Polyether triol, Ugipol U 1120[a] | 100 |
| Water | 3.5 |
| Amine catalyst (N,N—dimethylethanolamine[a]) | 0.30 |
| Stannous octoate-based metal catalyst | 0.25 |
| Silicone[b] | 0.80 |
| Flame proofing additive | 10 |
| Toluene diisocyanate, Lilene T 80[a], an 80/20 mixture of the 2,4- and 2,6-isomers (index: 106) | 43 |

[a]Produits Chimiques Ugine Kuhlmann, PCUK
[b]Goldschmidt BF 2370

The density of the slabs obtained on free expansion to dimensions of 0.2×0.2×0.2 m is about 30 kg/m$^3$. The tests of reaction to fire are carried out before and after accelerated aging of the samples in a 90° C. and 90% relative humidity box for 5 hours or for 24 hours.

The phosphonate mixture of Example I is incorporated as the flame proofing agent in a flexible foam composition. Two other compositions are prepared in the same manner in comparable amounts by replacing the mixture of the present invention with tris-(2-chloroethyl) phosphate (TCEP), or with Mobil Chemical Antiblaze 78. The results obtained are given in Table II.

TABLE II

| FLAME PROOFING ADDITIVE | WITHOUT AGING | | | | AGING FOR 5 HR | | | | AGING FOR 24 HR | | | |
|---|---|---|---|---|---|---|---|---|---|---|---|---|
| | Oxygen Index (%) | ASTM D-1692-68 | | | Oxygen Index (%) | ASTM D-1692-68 | | | Oxygen Index (%) | ASTM D-1692-68 | | |
| | | t* (sec) | l* (mm) | Class. | | t* (sec) | l* (mm) | Class. | | t* (sec) | l* (mm) | Class. |
| None (blank) | 17.3 | 69 | 127 | B | 17.4 | 85 | 127 | B | 18.1 | 81 | 127 | B |
| Phosphonate mixture of Example I | 23.6 | 32 | 32 | SE | 23.1 | 36 | 39 | SE | 23.0 | 58 | 66 | SE |
| TCEP | 21.6 | 53 | 55 | SE | 21.0 | 117 | 127 | B | 21.0 | 78 | 127 | B |
| Antiblaze 78 | 23.2 | 35 | 38 | SE | 22.6 | 47 | 57 | SE | 22.2 | 76 | 127 | B |

*t = combustion time
l = length of material destroyed by burning (total destruction = 127 mm)

The results obtained after accelerated aging especially demonstrate the advantages of the products of this invention and show the degree of permanence of the flame proofing effect obtained according to the present invention.

EXAMPLE VIII

Slabs of flexible polyurethane foams are prepared according to the formulation shown in Table III. These are so-called "high resilience".

TABLE III

| Ingredient | Parts by weight |
|---|---|
| Polyether triol Ugipol U 1340[a] | 100 |
| Water | 2.8 |
| Amine catalyst (Dabco 33 LV[b] + dimethylaminopropylamine[a]) | 0.7 |
| Glycerine | 2.0 |
| Triethanolamine[a] | 2.0 |
| Silicone[c] | 0.5 |
| Foaming agent, Forane 11[a] | 3.0 |
| Flame proofing additive | 3.5 |
| Isocyanate mixture, 60:40 crude MDI:pure TDI (index 105) | 48.4 |

[a]Produits Chimiques Ugine Kuhlmann, PCUK
[b]Houdry
[c]Goldschmidt 4113

The density of the 0.3×0.3×0.1 m molded slabs is about 40 kg/m$^3$.

The oxygen indices are measured as above and after accelerated aging of the samples in a ventilated oven at 140° C. for 22 hours. The phosphonate mixture of Example I is incorporated as a flame proofing additive in a foam composition. Three other foams are similarly prepared with comparable amounts of TCEP, Antiblaze 78 and Olin Corporation's Thermolin 101, Tetrakis-(2-chloroethyl) ethylene diphosphate. The results are shown in Table IV.

TABLE IV

| FLAME PROOFING ADDITIVE | OXYGEN INDEX WITHOUT AGING (%) | OXYGEN INDEX AFTER AGING (%) |
|---|---|---|
| None (blank) | 22.3 | 22.0 |
| Phosphonate mixture of Example I | 25.4 | 23.7 |
| TCEP | 23.8 | 23.3 |
| Antiblaze 78 | 25.4 | 23.0 |
| Thermolin 101 | 24.5 | 21.2 |

EXAMPLE IX

Polyurethane foam slabs are prepared using the formulation shown in Table V.

TABLE V

| Ingredient | Parts by weight |
|---|---|
| Polyether polyol Ugipol U 1120[a] | 100 |
| Water | 3.5 |
| Amine catalyst (Dabco 33 LV[b]) | 0.15 |
| Stannous octoate-based metal catalyst | 0.25 |
| Silicone[c] | 0.70 |
| Flame proofing additive | 10 or 20 |
| Toluene diisocyanate, Lilene T 80[a], an 80/20 mixture of 2,4- and 2,6- | 42 |

TABLE V-continued

| Ingredient | Parts by weight |
|---|---|
| isomers (index 105) | |

[a] Produits Chimiques Ugine Kuhlmann
[b] Houdry
[c] Union Carbide L 540

The density of the 0.2×0.2×0.2 m slabs obtained on free expansion is on the order of 32 kg/m³. The tests of reaction to fire are carried out before and after accelerated aging of the samples under the same conditions as shown in Example VII.

The phosphonate mixtures obtained in Examples II, III, IV, V and VI are incorporated as flame proofing additives in different amounts in the flexible foam compositions. Two other samples are similarly prepared with comparable amounts of Antiblaze 78 or chloropropyl phosphonate of bis-(chloropropyl) in lieu of the materials produced according to this invention. The chloropropyl phosphonate of bis-(chloropropyl) is prepared by the laboratory condensation of propylene oxide with phosphorous trichloride and thermal isomerization of the phosphite so obtained.

The results obtained are shown in Table VI.

foam slabs. The formulation used to prepare these slabs is shown in Table VII.

TABLE VII

| Ingredient | Parts by weight |
|---|---|
| Polyether triol Ugipol U 1120[a] | 100 |
| Water | 4.0 |
| Amine catalyst (N,N—dimethyl ethanolamine[a]) | 0.4 |
| Stannous octoate-based metal catalyst | 0.20 |
| Silicone[b] | 0.80 |
| Flame proofing additive | 10 |
| Toluene diisocyanate, Lilene T 80[a] (index 106) | 48.1 |

[a] Produits Chimiques Ugine Kuhlmann, PCUK
[b] Goldschmidt BF 3640

The density of the slabs obtained from this composition is about 27 kg/m³. These slabs are tested for their reaction to fire before and after accelerated aging of the samples, the accelerated aging being carried out in a humidity box at 90° C. and 90% relative humidity for 24 hours, followed by oven aging at 60° C. for 24 hours.

The phosphonate mixture obtained in Example VI is incorporated as the flame proofing additive in the foam composition. Three other compositions are similarly prepared with comparable amounts of TCEP, Thermolin 101, or Monsanto Company's Phosgard 2XC20 as a

TABLE VI

| FLAME PROOFING ADDITIVE | AMOUNT Parts per 100 of polyol | OXYGEN INDEX BEFORE AGING (%) | OXYGEN INDEX AFTER 5 HR AGING (%) | OXYGEN INDEX AFTER 24 HR AGING (%) |
|---|---|---|---|---|
| None (blank) | — | 16.8 | 17.5 | 18.5 |
| Phosphonate mixutre of Example II | 10 | 22.3 | 22.3 | 21.9 |
| Phosphonate mixture of Example III | 10 | 22.0 | 22.0 | 21.6 |
| Phosphonate mixture of Example IV | 10 | 22.5 | 22.1 | 21.7 |
| Phosphonate mixture of Example V | 10 | 22.1 | 22.7 | 23.0 |
| Antiblaze 78 | 10 | 21.9 | 21.9 | 21.4 |
| Chloropropyl phosphonate of bis-(chloropropyl) | 10 | 21.9 | 21.7 | 21.2 |
| Phosphonate mixture of Example VI | 20 | 23.3 | 23.0 | 22.6 |

EXAMPLE X

A low pressure (3 component) Admiral machine is used to prepare 2.0×0.7×0.6 m flexible polyurethane replacement for the compositions of the present invention. The results of measuring the physical properties and the reaction to flame of these various compositions are given in Table VIII.

TABLE VIII

| FLAME PROOFING ADDITIVE | NONE (blank) | EXAMPLE VI PHOSPHONATE MIXTURE | TCEP | THERMOLIN 101 | PHOSGARD 2XC20 |
|---|---|---|---|---|---|
| Preparation, rise time (sec) | 90 | 90 | 85 | 90 | 120 |
| Compression resistance according to NFT 56111 (dimensions: 40 × 45 × 10 cm) | | | | | |
| Load (N) 25% | 1.7 | 1.5 | 1.8 | 1.7 | 1.2 |
| 40% | 2.5 | 1.9 | 2.4 | 2.2 | 1.5 |
| 60% | 3.6 | 3.3 | 4.1 | 2.7 | 2.9 |
| Pulling resistance according to NFT 56108 | | | | | |
| Elongation (%) | 247 | 276 | 179 | 203 | 179 |
| Rupture (KPa) | 128 | 132 | 109 | 120 | 109 |
| Tear resistance according to NFT 56109 (N/m) | 588 | 520 | 443 | 445 | 495 |
| Oxygen index (%) before aging | 17.8 | 24.1 | 22.5 | 23.2 | 22.5 |
| Oxygen index (%) after aging | 18.5 | 23.0 | 19.9 | 22.9 | 22.7 |
| Horizontal combustibility according to ASTM D-1692-68 | | | | | |
| Before aging | | | | | |
| Combustion time (sec) | 60 | 35 | 84 | 39 | 40 |
| Destruction length (mm) | 127 | 40 | 120 | 47 | 49 |
| Classification | B | SE | SE | SE | SE |
| After aging | | | | | |
| Combustion time (sec) | 69 | 54 | 73 | 60 | 62 |
| Destruction length (mm) | 127 | 60 | 127 | 71 | 78 |
| Classification | B | SE | B | SE | SE |

The foregoing results conclusively demonstrate the ability of the mixtures of the present invention to improve the flame resistance of materials into which they are incorporated or with which they are otherwise used, while at the same time having little detrimental effect on the physical and mechanical properties of the materials with which the phosphonate mixtures of the present invention are used.

What is claimed is:

1. Phosphorus-containing mixtures for conferring improved flame retardance to combustible materials, which mixtures have low crystallization temperatures, the mixtures principally containing a plurality of phosphonates having the formula

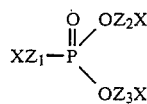

wherein X is chloro or bromo; $Z_1$, $Z_2$, and $Z_3$ are —$CH_2$—$CH_2$— or —$CH_2$—CHR—; and R is $CH_3$ or $CH_2Cl$, the overall mole ratio of the —$Z_nX$ groups of the —$CH_2$—$CH_2$—X type to the total —$Z_nX$ groups being from 0.02 to 0.90, n being 1, 2, or 3.

2. A flame-retarding mixture according to claim 1 wherein the mixture contains up to about 45 weight percent of high-boiling polyphosphonates having the formula

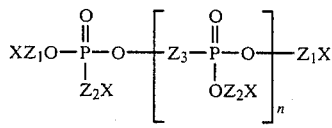

and/or

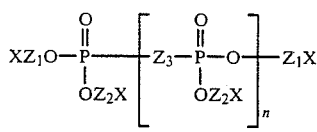

wherein R, X, $Z_1$, $Z_2$, and $Z_3$ are as set forth in claim 1 and n is an integer having a value of at least one.

3. A phosphorus-containing mixture according to claims 1 or 2 having a crystallization temperature and a flow point below 15° C.

4. A flame retarded combustible material having incorporated therein a small amount of a mixture according to claims 1 or 2 effective to improve the flame resistance of the material.

5. A flame retarded combustible material according to claim 4 containing from about one to about 20 percent by weight of a mixture according to claims 1 or 2.

6. A flame retarded combustible material according to claim 4 wherein the combustible material is a polyester, an epoxy, PVC, a synthetic and/or natural textile, a cellulosic material, or a rubber.

7. A flame retarded combustible material according to claim 4 wherein the combustible material is polyurethane.

8. A method for improving the flame resistance of combustible materials, which method comprises adding to such a combustible material an amount of a mixture according to claims 1 or 2 effective to impart flame resistance to the material.

* * * * *